United States Patent

Muratore et al.

[15] 3,649,093
[45] Mar. 14, 1972

[54] ANTIFRICTION BEARING WITH A DUAL CONTROL SEPARATOR

[72] Inventors: John B. Muratore, Castalia; Paul E. Peterson, Norwalk, both of Ohio

[73] Assignee: General Motors Corporation, Detroit, Mich.

[22] Filed: Aug. 10, 1970

[21] Appl. No.: 62,582

[52] U.S. Cl. ............................................. 308/193, 308/201
[51] Int. Cl. ........................................... F16c 33/00, F16c
[58] Field of Search ................................. 308/201, 193

[56] References Cited

UNITED STATES PATENTS 2,861,849  11/1958  Case ........................................ 308/201
3,506,316  4/1970  McKee ..................................... 308/201
3,008,559  11/1961  Forster .................................... 308/201

FOREIGN PATENTS OR APPLICATIONS 1,104,870  6/1955  France ..................................... 308/201

Primary Examiner—Edgar W. Geoghegan
Assistant Examiner—Frank Susko
Attorney—J. L. Carpenter and F. J. Fodale

[57] ABSTRACT

An antifriction bearing is provided with a separator having a first control surface for guiding the separator from the inner race at low speeds and temperatures and a second control surface for guiding the separator from the outer race at high temperatures and speeds.

4 Claims, 4 Drawing Figures

Patented March 14, 1972

3,649,093

INVENTORS
John B. Muratore &
Paul E. Peterson
BY
F. J. Fodale
ATTORNEY

ANTIFRICTION BEARING WITH A DUAL CONTROL SEPARATOR

Our invention relates generally to bearings and more specifically to the guidance of a separator in a bearing.

Separators can be classified into two general types according to the bearing elements used to control their positions or guide them during operation. The first type is "ball or roller controlled" which means that the separator is located within the bearing by its engagement with either the bearing balls or rollers depending on which is used. The second type is "ring controlled" which means that the separator is located from one of the races during operation. Ball or roller control is generally recognized as inadequate above a DN of 600,000. (DN is a performance number which is the product of the bearing speed in r.p.m. and the bore diameter of the bearing in mm.). In gas turbine applications where bearings often operate in excess of 2 million DN, "ring control" of the separator is therefore used. Such environments impose an appreciable temperature range within which the bearing must operate as well as a speed range. Consequently, "ring control" which may be adequate at low temperature and speed, such as during engine starting, may disappear or become excessive at high temperature and speed, such as during full power flight conditions. Conversely, the "ring control" provided at high temperature and speed may be lacking at low temperature and speed. The problem of providing adequate "ring control" over the operational range of the bearing is accentuated in those instances where the separator is made from a material different from that of the races having a markedly different thermal coefficient of expansion and/or modulus of elasticity.

In its broadest sense, it is the object of our invention to provide a bearing having a separator adequately "ring controlled" under diverse environmental conditions of temperature and speed.

Another object of our invention is to provide such a bearing in which the separator is controlled from one race under one set of temperature and speed conditions and from the other race under another set of temperature and speed conditions to provide adequate control under diverse operating conditions.

Another object of our invention is to provide such a bearing in which the separator control surfaces are so constructed as to minimize the effect of centrifugal loading.

Still another object of our invention is to provide adequate "ring control" for a nonferrous separator in a bearing wherein the separator has a higher thermal coefficient of expansion than the bearing races and inherent lubricating characteristics.

Yet another object of our invention is to provide a bearing with an unsymmetrical "ring controlled" separator which is inherently more stable than other prior known unsymmetrical "ring controlled" separators.

The exact nature of this invention as well as other objects and advantages thereof will be readily apparent from consideration of the following specification relating to the annexed drawing in which.

Figure 1:
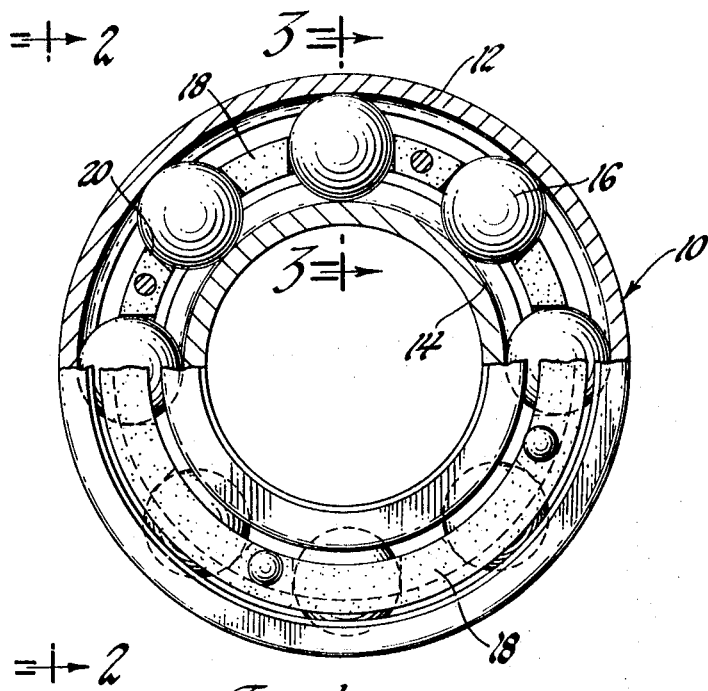
FIG. 1 is a front view, partially in section, of a ball bearing in accordance with our invention.
Figure 2:
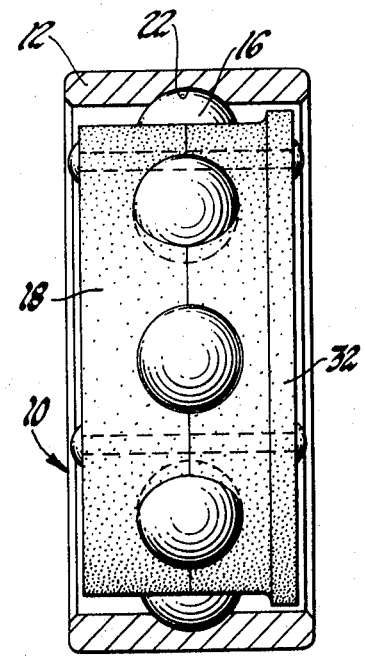
FIG. 2 is a section taken substantially along the line 2—2 of FIG. 1 and looking in the direction of the arrows.
Figure 3:
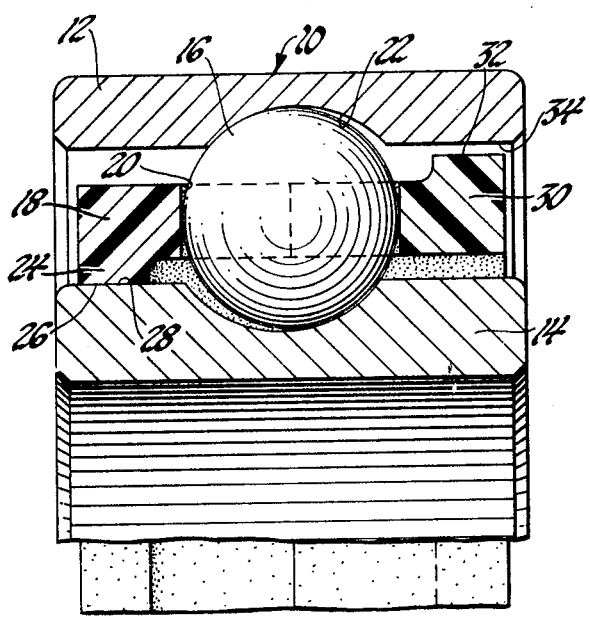
Figure 4:
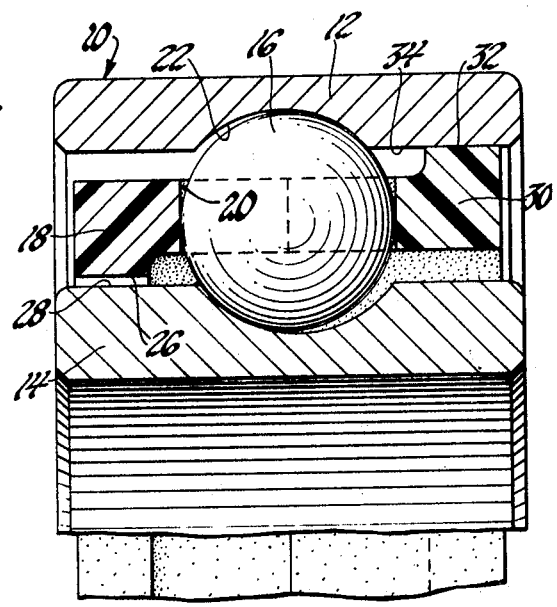

FIG. 3 is a section taken along the line 3—3 of FIG. 1 and shows the separator being controlled from the inner race in a low temperature, low speed operation such as is experienced in a gas turbine engine during starting; and FIG. 4 is a view similar to FIG. 3, except that the separator is now controlled from the outer race, as for example would occur in the high speed, high temperature environment of a gas turbine engine during full power flight.

Referring now to the drawings and, more specifically, to FIG. 1, the bearing 10 comprises an outer race 12, inner race 14, a complement of balls 16 and a polyimide plastic separator 18. The separator 18 has circular "straight-through" windows 20 which individually receive the balls 16 to circumferentially space them in the annular space between the races 12 and 14. By "straight-through", we mean that the contour of the window is constant throughout the depth of the separator. In the instant example, the window has a constant diameter which is slightly greater than that of the balls 16 so as to provide a running clearance. By virtue of the windows 20 being "straight-through", they do not impart any control to the separator 18 which is an important feature as the separator 18 is "ring controlled". The races illustrated are of the deep-groove type having a raceway 22 bordered on each side by a shoulder, each providing a circumferential land which potentially is a "ring-control" land. However, it is to be understood that our invention is equally applicable to angular contact bearings having only one shoulder per race or any antifriction bearing for that matter, so long as each race may provide one ring control land.

Referring now to FIG. 3, it is seen that the separator 18 is unsymmetrical about a plane perpendicular to the axis of the bearing. The Z-shaped separator includes a radially inwardly extending shoulder 24 on the left end ring of the separator. The shoulder 24 provides a circumferential land 28 on the inner race 14. A radially outwardly extending shoulder 30 on the right end ring of the separator 18 provides a circumferential control surface 32 which is spaced from the land 34. It is to be understood that the spacing between the surfaces 26 and 32 and lands 28 and 34 respectively have been greatly exaggerated in FIGS. 3 and 4. FIG. 3 represents one operation mode of our invention and the importance of the illustration lies in the fact that the separator 18 is controlled from the land 28 through surface 26. This control may be effected by intimate contact, such as is shown and which requires a separator of inherent lubricity, such as polyimide plastic. The control also may be effected by a slight spacing of the surface 26 and 28 with and a lubricating film therebetween. The importance of the spacing between the surfaces 32 and 34 is that the spacing should be adequate enough at the operating condition shown in FIG. 3 so that upon reaching the operating condition shown in FIG. 4, separator control is provided by the outer race land 34 through control surface 32. Again, the control may be affected by intimate contact or through a lubricating film.

The shifting of control from the inner race (FIG. 3) to the outer race (FIG. 4) is necessitated by the different radial growth between the bearing parts. This is primarily caused by a temperature rise, although centrifugal loading due to high speed operation is a factor. The centrifugal loading vis-a-vis the unsymmetrical separator configuration is compensated for by making the cross section of the shoulder 24 larger than the cross section of the shoulder 30 which is at a larger effective radius. This minimizes the tendency of the separator 18 to bell mouth and provides an inherently more stable separator.

We wish it to be understood that we do not desire to be limited to the exact details of construction shown and described, for obvious modifications will occur to a person skilled in the art.

We claim:

1. An antifriction bearing for use in a high speed, high temperature environment such as a gas turbine engine or the like, comprising in combination, a ferrous metal inner race having a first circumferential control land, a ferrous metal concentric outer race having a second circumferential control land, a complement of antifriction elements disposed between and rollably engageable with said races, a nonferrous separator having end rings with first and second circumferential control lands, said separator having a thermal coefficient of expansion appreciably higher than that of said races and being controlled only by said first control surface engaging said first control land on said inner race under low speed, low temperature starting conditions of a gas turbine or the like, and only by said second control surface engaging said second control land on said outer race under high speed, high temperature operating conditions of a gas turbine or the like, and a plurality of windows in said separator receiving said complement of antifriction elements, said windows being sufficiently larger than said antifriction elements so that said antifriction elements are circumferentially spaced by said separator without imparting control to said separator.

2. The antifriction bearing as defined in claim 1 wherein said first control surface is on a radially inwardly projecting shoulder on one end ring of said separator and said second control surface is on a radially outwardly projecting shoulder on the other end ring of said separator.

3. The antifriction bearing as defined in claim 2 wherein the cross-sectional area of said radially inwardly projecting shoulder is greater than the cross-sectional area of said radially outwardly projecting shoulder to equalize the centrifugal loading thereon.

4. The antifriction bearing as defined in claim 3 wherein said separator is made from a polyimide plastic.

* * * * *